US008888891B2

(12) United States Patent
Sakakibara et al.

(10) Patent No.: US 8,888,891 B2
(45) Date of Patent: Nov. 18, 2014

(54) METAL RECOVERY METHOD USING PROTONEMATA OF MOSS PLANTS

(75) Inventors: Hitoshi Sakakibara, Kanagawa (JP); Misao Itouga, Kanagawa (JP); Yukari Komatsu, Kanagawa (JP); Satoshi Kawakami, Tokyo (JP)

(73) Assignees: Riken, Saitama (JP); Dowa Holdings Co., Ltd., Tokyo (JP)

( * ) Notice: Subject to any disclaimer, the term of this patent is extended or adjusted under 35 U.S.C. 154(b) by 526 days.

(21) Appl. No.: 13/375,341

(22) PCT Filed: Jun. 1, 2010

(86) PCT No.: PCT/JP2010/059584
§ 371 (c)(1),
(2), (4) Date: Nov. 30, 2011

(87) PCT Pub. No.: WO2010/140701
PCT Pub. Date: Dec. 9, 2010

(65) Prior Publication Data
US 2012/0067172 A1 Mar. 22, 2012

(30) Foreign Application Priority Data
Jun. 1, 2009 (JP) .................................. 2009-132208

(51) Int. Cl.
| | | |
|---|---|---|
| *C22B 11/00* | (2006.01) | |
| *C22B 3/20* | (2006.01) | |
| *C02F 3/32* | (2006.01) | |
| *C22B 3/00* | (2006.01) | |
| *C22B 3/24* | (2006.01) | |
| *A01G 1/00* | (2006.01) | |
| *C02F 101/20* | (2006.01) | |
| *C22B 3/18* | (2006.01) | |
| *C02F 103/10* | (2006.01) | |
| *C02F 1/28* | (2006.01) | |

(52) U.S. Cl.
CPC ................. *C22B 3/24* (2013.01); *C22B 11/042* (2013.01); *C02F 2101/20* (2013.01); *C22B 3/18* (2013.01); *C02F 3/32* (2013.01); *C02F 2103/10* (2013.01); *C22B 11/04* (2013.01); *C02F 1/286* (2013.01); *A01G 1/00* (2013.01)
USPC ........................................... 75/711; 210/602

(58) Field of Classification Search
CPC ......... C22B 3/18; C22B 3/0098; C02F 1/286; B01J 2/14; B01J 20/24; Y10S 210/912; Y10S 423/17
USPC .............. 75/428; 423/DIG. 17; 210/660, 681, 210/684, 688; 502/401
See application file for complete search history.

(56) References Cited

U.S. PATENT DOCUMENTS
4,936,910 A * 6/1990 Dadgar et al. .................. 75/428

FOREIGN PATENT DOCUMENTS

| JP | 2005-046666 | 2/2005 | |
|---|---|---|---|
| WO | WO-2007/043657 A1 | 4/2007 | |
| WO | WO-2008/105353 A1 | 4/2008 | |
| WO | WO 2008105353 A1 * | 9/2008 | ................ C02F 3/32 |

OTHER PUBLICATIONS

Krzeslowska et al., "Pectinous cell wall thickenings formation—A response of moss protonemata cells to lead," Environmental and Experimental Botany, Jan. 1, 2009, 65(1):119-131.
Supplementary European Search Report dated May 9, 2014, in EP 10783483.0.
International Search Report PCT/JP2010/059584 dated Aug. 30, 2010.
Ahmet Sari et al., "Biosorption of palladium(II)from aqueos solution by moss (Racomitrium lanuginosum) biomass: Equilibrium, kinetic and thermodynamic studies", Journal of Hazardous Materials 162 (2009) pp. 874-879.
Wang Wenyun et al., "Study on Heavy Metal Enrichment Characteristics of Mosses in Laowanchang Gold Mine and Their Ecological Rehabilitation Potential", Metal M NE, pp. 134-139, Series No. 387, Sep. 2008, 1994-2013 China Academic Journal Electronic Publishing House.

* cited by examiner

*Primary Examiner* — Kaj K Olsen
*Assistant Examiner* — Jared Wood
(74) *Attorney, Agent, or Firm* — Foley & Lardner LLP (57) ABSTRACT

Disclosed is a method for recovery of a metal using plants. The method for recovery of a metal involves bringing a protonema of a moss plant belonging to the family Funariaceae into contact with a metal-containing solution in which a metal(s) having an ionization tendency lower than that of silver is dissolved.

8 Claims, 3 Drawing Sheets

METAL RECOVERY METHOD USING PROTONEMATA OF MOSS PLANTS

CROSS REFERENCE TO RELATED APPLICATIONS

This application is the U.S. National Phase of PCT/JP2010/059584 dated Jun. 1, 2010 which claims priority from Japanese Patent Application No. 2009-132208 dated Jun. 1, 2009. The subject matter of each of these applications is incorporated herein by reference.

The application contains at least one drawing executed in color. Copies of this patent or patent application publication with color drawing(s) will be provided by the Office upon request and payment of the necessary fee.

TECHNICAL FIELD

The present invention relates to a method for recovery of a metal using a protonema of a moss plant, and specifically to a method for recovery of a metal having an ionization tendency lower than that of silver. The present invention particularly relates to a method for recovery of gold using a protonema of a moss plant.

BACKGROUND ART

Materials and techniques for recovery of metals from wastewater containing metals (e.g., gold) discharged from industries related to mining, plating, surface treatment, inorganic chemistry, and the like have been reported to date.

For example, patent literature 1 discloses a gold adsorbent that is a lignin derivative prepared by adding a phenolic compound to wood powder generated by lumber sawing or the like, further adding concentrated sulfuric acid to perform a reaction, thereby allowing lignin to bind to the phenolic compound, and then isolating a resulting lignin derivative. The prior art technique using such a lignin derivative is problematic in terms of environmental load level from the view points that carbon-fixed woody biomass resources are consumed and utilized and that a chemical such as sulfuric acid is newly added. As other gold recovery techniques that involve performing biological treatment utilizing fungi and plant organic biomass, treatments utilizing organic aminocarboxylic acid-degrading microorganisms (patent literature 2), cyanogen forming and degrading microorganisms (patent literature 3), and cellulose-containing organic resources (patent literature 4) have been reported.

As another example of a method for recovery of various metals utilizing a phytomining technique, non patent literature 1 reports a technique that involves planting *Brassica juncea* in soil to which gold has been added, and causing the root system to absorb gold, thus resulting in accumulation of about 5-50 nm gold nanoparticles at a concentration of 760-1120 ppm per plant body dry weight. However, this technique has not yet been demonstrated at the practical level since the accumulated gold concentration level as an ability to recover gold is low and soil is the subject for the technique.

Also, patent literature 5 by the present inventors discloses a method for removal of lead utilizing a protonema of a moss plant as an adsorbent. The literature further discloses that lead can be selectively removed from an ash eluate and an artificially mixed solution by the technique using protonema cells of a moss plant as a lead adsorbent, and that the lead-accumulating ability is not significantly inhibited by B, Na, Mg, Al, P, K, Ca, Cr, Mn, Fe, Co, Ni, Cu, Zn, As, Cd, and Hg contained in the ash eluate or Cu in the artificial mixed solution. However, the literature does not disclose the presence or the absence of the ability to recover industrially valuable metals, such as rare metals, rare earths, and noble metals, nor the scale of such ability.

CITATION LIST

Patent Literature

Patent Literature 1 JP Patent Publication (Kokai) No. 2005-305329 A
Patent Literature 2 JP Patent Publication (Kokai) No. 2002-192186 A
Patent Literature 3 JP Patent Publication (Kokai) No. 2007-308762 A
Patent Literature 4 JP Patent Publication (Kokai) No. 2008-302356 A
Patent Literature 5 WO 2008/105353

Non Patent Literature

Non Patent Literature 1 International Journal of Phytoremediation 9: 197-206 (2007)

SUMMARY OF THE INVENTION

An object of the present invention is to provide a method for recovery of a metal using plants that are practical and can grow under various environments.

The present inventors have now further evaluated the ability to recover various metals using protonemata of moss plants, as disclosed in patent literature 5 (WO 2008/105353), and have now surprisingly found that the moss plants are also capable of accumulating at high levels metals having ionization tendencies lower than that of silver. In general, it is difficult for a metal having a lower ionization tendency to exist in a soluble form in environmental water. Also, moss plants utilize water soluble metal ions to live. Thus, it is presumed that there has been almost no chance of contact between a metal having lower ionization tendency and a moss plant during the long process of evolution. Accordingly, it is considered to be unlikely that the moss plants have acquired the ability to accumulate metals having lower ionization tendencies. Hence, this finding is surprising. The invention of the present application is based on the finding.

In summary, the present invention has the following features.

(1) A method for recovery of a metal having an ionization tendency lower than that of silver, comprising bringing a protonema of a moss plant belonging to the family Funariaceae into contact with a solution in which the metal is dissolved.
(2) The method according to (1) above, wherein the protonema is of one or more moss plant(s) selected from the group consisting of the genus *Funaria*, the genus *Physcomitrium*, and the genus *Entosthodon*.
(3) The method according to (1) above, wherein the protonema is of one or more moss plant(s) belonging to the genus *Funaria*.
(4) The method according to (1) above, wherein the protonema is of *Funaria hygrometrica* Hedw.
(5) The method according to (1) above, wherein the metal having an ionization tendency lower than that of silver is gold and/or platinum.
(6) The method according to (1) above, wherein the solution in which the metal is dissolved has a pH from 1.0 to 12.0.

(7) The method according to (1) above, wherein the protonema has a maximum ability to accumulate gold accounting for 10% or more of the dry weight of protonema.
(8) The method according to (1) above, wherein the protonema has a maximum ability to accumulate platinum accounting for 4% or more of the dry weight of protonema.
(9) A protonema of a moss plant, which has been used in the method according to any one of (1) to (8), and in which at least one metal having an ionization tendency lower than that of silver is accumulated.
(10) The protonema according to (9) above, wherein the metal is gold and/or platinum.
(11) The protonema according to (9) above, which shows a color between red and reddish violet, inclusive.

The contents disclosed in the description and/or drawings of Japanese Patent Application No. 2009-132208, to which the present application claims priority, are incorporated herein by reference.

EMBODIMENTS FOR CARRYING OUT THE INVENTION

The present invention provides a method for recovery of a metal having an ionization tendency lower than that of silver using the protonema of a moss plant (hereinafter, simply referred to as "the method of the present invention"). Specifically, the term "metal having an ionization tendency lower than that of silver" as used herein refers to one or more metal(s) such as gold and platinum, and preferably to gold and platinum. Such a metal is simply referred herein to as the metal according to the present invention. Specifically, the method of the present invention comprises bringing a solution in which the metal(s) according to the present invention is dissolved (hereinafter, also simply referred to as a metal-containing solution) into contact with the protonema of a moss plant of the present invention.

Examples of the metal-containing solution that can be subjected to the method of the present invention include, but are not particularly limited to, industrial drainages or liquid waste, domestic wastewater, eluates from combustion fly ash of waste materials, agricultural water, holding pond water, river water, ground water, mine effluents or liquid waste, metallurgy wastewater, and ballast water, as long as the metal(s) according to the present invention is dissolved in the solution. In particular, solutions for which economic benefits from metal recovery cannot be expected using conventional methods in view of the costs required for metal recovery, can preferably be subjected to the method of the present invention. Examples of such solutions include gold-containing drainages (or liquid waste) from which gold could not be thoroughly recovered in gold recovery processes at gold recycling factories, and environmental water, such as seawater, expected to contain gold at an ultratrace concentration. The pH of a gold-containing solution and the concentration of gold in the gold-containing solution are not particularly limited. For example, the pH can range from 1.0 to 12.0, preferably from 1.5 to 10.0, and the gold concentration can be from 0.0001 mg/mL to 400 mg/mL, preferably from 0.0008 mg/mL to 200 mg/mL. Therefore, the gold-containing solutions can be subjected to the method of the present invention without specific pretreatment, except treatment such as neutralization that is generally performed in the art upon handling of these solutions.

The protonemata of moss plants used in the present invention are protonemata of moss plants belonging to the family Funariaceae, which are capable of absorbing and accumulating the metals according to the present invention. Examples of such moss plants belonging to the family Funariaceae include moss plants belonging to the genus *Physcomitrium*, the genus *Entosthodon*, and the genus *Funaria*. Preferably the protonemata of moss plants belonging to the genus *Funaria* are used, and most preferably the protonemata of *Funaria hygrometrica* Hedw. are used. Also, the protonemata of moss plants used in the present invention may be of mutant moss plants prepared by artificially introducing mutations into moss plants as listed above. Examples of mutagenesis methods include irradiation of heavy ion beams, X-ray, gamma ray, or neutron ray. The mutant moss plants prepared using heavy ion beams can be prepared, for example, by methods as described in Japanese Patent No. 3577530, International Publication No. WO 03/056905, or the like.

The term "protonema" refers to a branched filamentous tissue resulting from repeated cell divisions of a spore-derived cell. A protonema contains many chloroplasts, so as to have a green color, and appears in a form like filamentous green algae. The term "protonema" as used herein includes a protonema in a living cell form, a cell wall preparation of protonema, and a mixture thereof.

The protonema of a moss plant of the present invention can be separated by use of a precipitation tank, centrifugation, or suction filtration. Also, the cell wall preparation of the protonema of the present invention can be prepared as follows, for example. Specifically, first, the protonema of a moss plant is destroyed in 0.05M phosphate buffer (pH 6.5) using a mortar, a pestle, or the like, and then subjected to centrifugation (3000 rpm, 10 minutes). Subsequently, acetone is added to the precipitation, and then left to stand overnight at room temperature, followed by 3 rounds of 10 minute-centrifugations at 1000 rpm. Thereafter, the precipitate is dried overnight at room temperature and is recovered as crude cell walls. The thus recovered crude cell walls are placed in a centrifugation tube containing ultrapure water, methanol, and chloroform. After 1 hour shaking, centrifugation is performed (3000 rpm, 10 minutes). Subsequently, the methanol layer (i.e., aqueous layer) is recovered and evaporated. The residual fraction is used as a cell wall preparation. It may be used after lyophilization and storage, if necessary.

The protonemata of moss plants of the present invention can be grown in large amounts by aerated liquid culture. Typically, aerated liquid culture is performed by filling an appropriate incubator with a culture solution containing the protonema of a moss plant of the present invention and performing aeration with sterile air. The culture can be performed in a culture solution containing a phosphorus source, inorganic salts, glucose, amino acids, vitamins, and the like. In an embodiment of the present invention, the culture can be efficiently performed in a culture solution containing $KNO_3$ (potassium nitrate), $MgSO_4$ (magnesium sulfate), $KH_2PO_4$ (potassium phosphate monobasic), $FeSO_4$ (iron sulfate), $MnSO_4$ (manganese sulfate), $H_3BO_3$ (boric acid), $ZnSO_4$ (zinc sulfate), KI (potassium iodide), $Na_2MoO_4$ (sodium molybdate), $CuSO_4$ (copper sulfate), $CoCl_2$ (cobalt chloride), $(NH_4)_2C_4H_4O_6$ (ammonium tartrate), $CaCl_2$, and the like, but the examples are not limited to them. The concentration of each component in the culture solution can be appropriately determined by a person skilled in the art. For example, it is a concentration as described in Example 1 below. Examples of the temperature conditions for culture include, but are not limited to, 15° C. to 25° C., preferably 18° C. to 22° C., and most preferably 20° C. Also, the light conditions for culture include, but are not limited to: the light-to-dark ratio about 16:8 to about 24:0, preferably about 16:8; wavelength region 400 nm to 700 nm; and light intensity 6500 lux to 7500 lux. Also, the aeration volume can be appropriately determined by persons skilled in the art depending on the size of a culture vessel and the amount of a culture solution to be contained in the culture vessel. For example, aeration can be performed at about 1 to 2 L/min, and preferably about 1.4 L/min. Regarding the outline for aerated liquid culture, see Decker E L. And Reski R. (2004). The moss bioreactor. Current Opinion in Plant Biology 7: 166-170; Hoche A. and Reski T. (2002) Optimisation of a bioreactor culture of the moss Physcomitrella patens for mass production of protoplasts, Plant Science 16f3: 69-74; and S.-Y. Chiou et al., Journal of Biotechnology 85 (2001) 247-257, for example.

Also, to improve culture efficiency, it is preferable to prevent a fibrous protonema from forming a spherical mass thereby causing death of the protonema within the sphere, by using an agitator or by controlling convection. Examples of the agitators usable in the former case include, but are not limited to, batch-type mixer, impeller-type agitator, blade mixer, rotor/stator-type mixer, and rotary shaker. For example, agitation can be performed at 50-100 rpm. In the latter case, preferably, a flat incubator is used, and agitation speed and aeration flow rate are set so as to prevent the protonema from forming a spherical mass due to convection resulting from aeration.

The thus cultured protonema of a moss plant of the present invention can be stored for at least a half year in a 15-mL test tube containing 12 mL of the protonema (in the dark; 4° C.).

The protonema of a moss plant can absorb and accumulate the metals according to the present invention under acidic conditions (pH 1.5 or 3.0) or alkaline conditions (pH 10.0), and thus have an advantage such that the protonema can be brought into direct contact with drainage containing various metals without adjusting pH (see Example 2 below).

Other features of the protonema of a moss plant are that the protonema has resistance to heavy metals such as Cu, Zn, Co, and As, that the growth thereof is not inhibited even under an environment with a pH of 5 to 12, and particularly under a high alkaline environment with a pH of 9 to 12, and the like (see WO 2008/105353).

The protonema of a moss plant of the present invention may be brought into contact with a metal-containing solution by any means. The protonema of a moss plant of the present invention can be used in a suspended form and/or an immobilized form and then brought into contact with the above solution, for example. When the protonema is used in a suspended form, the protonema or the immobilized protonema is suspended in an appropriate solution, and then a metal-containing solution is supplied to the suspension, so that the above contact can be performed. As a solution used for suspending the protonema or the immobilized protonema, any solution may be used, as long as it does not inhibit the growth of the protonema and the ability to accumulate the metals according to the present invention. For example, water, ultrapure water, distilled water, service water, culture solution, seawater, and the like can be used.

When the protonema of a moss plant of the present invention is used in an immobilized form, the above contact can be performed by supplying a metal-containing solution to the protonema planted in an appropriate cultivation bed or immobilized to an appropriate carrier. Examples of cultivation beds usable in the present invention include, but are not limited to, materials with good water-absorbing property and water permeability such as wet moss, polyurethane, rock wool, foam glass, felt, and paper. Examples of a method that can be employed for immobilization of the protonema of the present invention include methods well known by persons skilled in the art such as carrier binding method and entrapment method. The carrier binding method comprises binding the protonema of the present invention to a water-insoluble porous carrier via adsorption or the like. In this case, polysaccharide derivatives such as cellulose, dextran, and agarose; synthetic polymers such as polyacrylamide gel, polystyrene resins, ion exchange resins, polyurethane, and photo-curing resins; and inorganic materials such as porous glass, pumice, and metallic oxides can be used as carriers. Also, the entrapment method comprises entrapping the protonema of the present invention in a gel matrix of natural polymer or synthetic polymer. Examples of macromolecular compounds that can be used herein include, but are not limited to, polyacrylamide gel, polyvinyl alcohol, photo-curing resins, starch, Amorphophalus (konjak) powder, gelatin, alginic acid, and carrageenan.

The protonemata of moss plants of the present invention brought into contact with a metal-containing solution as described above can absorb and accumulate the metals, such as gold accounting for a maximum of 10% or more of the dry weight of the protonema, and platinum accounting for a maximum of 4% or more of the dry weight of the protonema, although the amount varies depending on the types of metals to be absorbed and accumulated. Subsequently, where needed, a metal of interest may be recovered by heat treatment or extraction of the protonema. The recovery of metals can be performed by the conventional metal refining. For example, in the case of gold recovery, the above protonema is dissolved as a raw material for melt refining and then a gold product is produced via steps such as electrorefining.

The method of the present invention is advantageous in terms of costs associated with the recovery of metals, since the protonema of a moss plant that is conveniently available and can cultured in large amounts is used. Also, the protonema of a moss plant has the features that it can absorb and/or accumulate the metals according to the present invention under either acidic conditions (pH 1.5 or 3.0) or alkaline conditions (pH 10.0) and that it has a resistance to heavy metals such as Cu, Zn, Co, and As. Hence, upon contact with various metal-containing solutions, the method of the present invention is advantageous in that: it requires no specific pretreatment (such as pH adjustment, addition of sulfuric acid, cyanogen cleavage, and the like) except for treatment such as neutralization that is generally performed in the art upon handling of these solutions; it is convenient; and it imposes a low environmental load.

The present invention also encompasses protonemata of moss plants in which at least one metal having an ionization tendency lower than that of silver is absorbed and accumulated by the method of the present invention. The protonemata of moss plants according to the present invention can accumulate either one of gold or platinum or both thereof preferably at at least 10 mg/kg, more preferably at at least 25 mg/kg. The protonemata of moss plants having accumulated gold according to the present invention can be characterized in that they show a color between red and reddish violet, inclusive, depending on the particle size of accumulable gold nanocolloids. Also, the moss plants having accumulated platinum according to the present invention can be visually characterized in that they show a shiny brown color.

The present invention can further provide a recovery apparatus for use in the method for recovery of a metal of the present invention. The recovery apparatus is equipped with a holding tank and a suspension of the protonema of a moss plant of the present invention contained in the tank.

As holding tanks, tanks in all shapes can be used, including columnar, flat, tubular, box-like shaped containers. Examples thereof are not limited thereto. In the case of a tank without agitator, the tank is preferably flat-shaped in order to prevent the protonema from forming a spherical mass thereby lowering the ability to accumulate the metals according to the present invention. As used herein, the term "flat(-shaped)" refers to, in the case of a rectangular container, for example, a vertically long, flat shape such that the longitudinal width of the upper surface is about one fourth or less the horizontal width. When the tank is a column, a cylindrical column or a flat column can be used. The material of the holding tank can be selected depending on the amount of a protonema suspension in the tank. Material that is used should not deteriorate with time. Examples of such material include, but are not limited to, glass, metals (e.g., stainless steel), acrylic resins, plastics, and polycarbonate.

An apparatus used for the recovery method of the present invention may have a supply port for supplying a metal-containing solution to a holding tank and a discharge port for discharging the solution from which metals have been recovered. In such case, the solution from which metals have been recovered can be discharged from the discharge port while a metal-containing solution is supplied from the supply port, so that the recovery of a metal(s) can be continuously performed.

The apparatus may be equipped with piping connected to the supply port and/or the discharge port for convenient supply of a metal-containing solution and/or for discharge of a solution from which metals have been recovered. This enables connection to an appropriate control device that regulates the amount of a metal-containing solution supplied or enables discharge of the solution from which metals have been recovered to an appropriate place. The flow rate of a metal-containing solution to be supplied is preferably a flow rate that regulates the rate of metal recovery by the protonema of a moss plant of the present invention filled in a holding tank at a constant rate, and specifically, such a rate that the supplying amount of a metal-containing solution and the discharging amount of a solution from which metals have been recovered are maintained almost at a constant level. Therefore, in another embodiment of the present invention, the apparatus may be equipped with a control device for controlling the flow rate of a metal-containing solution to be supplied to a holding tank. Examples of such a control device include Peristar pumps and digital pumps.

The above apparatus may have an opening-closing means for switching the discharge of a solution, from which metals have been recovered, from a holding tank. Examples of such an opening-closing means include a valve mounted on piping provided at a discharge port, an automatic opening-closing valve, a joint, a coupling, and a three way-branched cock.

Preferably, the above apparatus may have two or more partition walls within the holding tank, which can retain a protonema and allows liquid permeation. The partition walls prevent the effusion of the protonema from the holding tank, retain the protonema within the holding tank, and provide a plurality of zones within the holding tank, so as to perform metal recovery from a metal-containing solution by the protonema existing in each zone in a stepwise manner. Because of the partition walls, a supplied metal-containing solution gently migrates within the above holding tank, so that sufficient contact between the metal-containing solution and the protonema can be realized. The above partition walls are made of a material that enables solution permeation while preventing the effusion of the protonema. Examples thereof include, but are not limited to, metal mesh, glass fiber filter, filter paper, cotton, glass wool, and rock wool pieces.

The above tank of the apparatus of the present invention can be further equipped with a supply port for supplying a fresh protonema suspension and a discharge port for discharging the used protonema suspension. The protonema within the tank can grow by photosynthesis and use of nutrients contained in a metal-containing solution. Meanwhile, when the metal-accumulating amount of a protonema reaches saturation (e.g. as described above, gold is accumulated to a level accounting for 10% or more of the dry weight of protonema), it is required to exchange the protonema with a fresh protonema. For such exchange with fresh protonema, the supply port and the discharge port are preferably provided within the interior of the tank. Also, in an embodiment of the present invention in which two or more partition walls are provided within the tank, it is preferable to provide the supply port and the discharge port between the partition walls.

Preferably, the apparatus is equipped with one or more devices for culturing the protonema of the present invention while recovering metals in a metal-containing solution. Examples of such devices include a light source for supplying light to the protonema, a device for supplying medium components for efficient culture, an agitator, a temperature control unit, and an aerator for aerated liquid culture.

The above light source is used for intermittently supplying light within a wavelength region required for the photosynthesis of the protonema of the present invention at an appropriate light-to-dark ratio. A preferable wavelength region ranges from 400 nm to 700 nm, and preferable light intensity is from 6500 lux to 7500 lux. The light source is typically positioned at an arbitrary position within the holding tank. When the holding tank is made of light-permeable material, the light source may be positioned outside the holding tank.

The above device for supplying medium components is used for continuously supplying culture components that enable efficient culture at predetermined concentrations. Culture components may be supplied by directly adding culture components to a suspension within a holding tank, or by providing an apparatus for adding culture components to a metal-containing solution to be supplied to the apparatus of the present invention.

The agitator is a device for realization of agitation to a degree such that the protonemata do not form a spherical mass during culture. Examples of such an agitator include, but are not limited to, batch-type mixer, impeller-type agitator, blade mixer, rotor/stator-type mixer, and rotary shaker.

The temperature control unit is an arbitrary unit for maintaining a temperature suitable for culturing the protonema in the holding tank. Examples of such a temperature control unit include, but are not limited to, thermostat, incubator, artificial climatic chamber, and incubator. The temperature suitable for culture is typically from 15° C. to 25° C., preferably from 18° C. to 22° C., most preferably 20° C.

The aerator is an arbitrary aerator for supplying sterile air to the suspension of a protonema within the holding tank. In this embodiment, in order to prevent the protonema from forming a spherical mass through agitating by means of aeration without using an agitator that is generally required upon culture, a flat holding tank is preferably used, and preferably agitation speed and aeration flow rate are set for the aerator to degrees such that the protonema does not form a spherical mass during culture. Such a flat holding tank that can be used in this case is a holding tank having a size such that the ratio of longitudinal width:lateral width:height is 1:4:9, preferably 3:11:27. Also, the "agitation speed and aeration flow rate set to degrees such that the protonema does not form a spherical mass" can be appropriately determined by persons skilled in the art depending on the size of the holding tank.

Preferably, the apparatus is equipped with a supply port and a discharge port for supplying the protonema to and discharging the protonema from the holding tank, whereby the protonema that has a saturated accumulation of metals, the dead protonema, or the protonema that have grown excessively through culture, can be eliminated. As a result, the protonema contained within the holding tank can be maintained at a concentration appropriate for metal recovery and/or culture. The amount of protonema retained in the holding tank is preferably maintained at 0.1 mg to 1 mg (dry weight)/mL.

The apparatus is preferably an apparatus comprising a combination of two or more holding tanks. Specifically, such an apparatus can be constructed by allowing a discharge port of a first holding tank to communicate with a supply port of a second holding tank of the present invention via piping, for example. By increasing the number of holding tanks to be combined, efficiency of metal recovery from a metal-containing solution can be improved, and the apparatus can be scaled up. A plurality of holding tanks may be combined in series or in parallel. In this case, preferable holding tanks are column-shaped tanks.

Hereinafter, the present invention is more specifically described using Examples, but the scope of the present invention is not limited to these Examples.

EXAMPLE 1

Establishment of Mass Culture System for Protonema

Spores from sporophytes of *Funaria hygrometrica* Hedw. collected from a field were seeded, so that a single-spore-derived protonema was isolated. This is briefly explained as follows. First, sporophytes at the stage of maturation were prepared. The seta of sporophytes were picked up using tweezers, immersed in a 2.5% sodium hypochlorite solution for 60 seconds, and then immersed in a 0.1% benzalkonium chloride solution for 30 seconds. Next, after 30 seconds of immersion in sterile water (which is distilled water that had been autoclaved at 121° C. for 20 minutes), caps of sporophytes were opened using sterilized tweezers. The thus opened sporophytes were shaken on an agar medium, so that spores were spread and seeded on the agar medium. The agar medium on which spores had been seeded was placed in a culture rack. Twenty (20) days later, the single-spore-derived protonema was picked up using sterilized tweezers in a clean bench and then subcultured on a new agar medium. Grown protonemata after 14-days culture were placed in a 1.5-ml microtube containing 1 ml culture solution. A suspension prepared by slightly suspending the solution with a microtube pestle was again seeded onto an agar medium, so that a single-spore-derived protonema strain was maintained. Thereafter, the thus isolated protonema was cultured by an aerated liquid culture (batch culture) method. The culture period was set to 14 days (light condition:light:dark=16:8; temperature: 20° C.) or 30 days (light condition: continuously in the light; temperature: 20° C.). The protonema mixed solution obtained after culture was homogenized using polytron homogenizer (PT2100 KINEMATICA), and 1 mL of the thus obtained protonema suspension was added to a new culture solution in order to continuously maintain the culture. The composition of the culture solution was: 10 mM $KNO_3$ (potassium nitrate), 1 mM $MgSO_4$ (magnesium sulfate). 2 mM $KH_2PO_4$ (potassium phosphate monobasic), 45 μM $FeSO_4$ (iron sulfate), 1.6 μM $MnSO_4$ (manganese sulfate), 10 μM $H_3BO_3$ (boric acid), 0.2 μM $ZnSO_4$ (zinc sulfate), 0.2 μM KI (potassium iodide), 0.1 μM $Na_2MoO_4$ (sodium molybdate), 0.2 μM $CuSO_4$ (copper sulfate), 0.2 μM $CoCl_2$ (cobalt chloride), 5 mM $(NH_4)_2C_4H_4O_6$ (ammonium tartrate), and 1 mM $CaCl_2$. 500 mL culture solution was added per 650-mL flat culture bottle (for aerated liquid culture method).

The amount of protonema grew to about 290 times the original amount with the above aerated liquid culture method (348.9 mg protonema was recovered from 1.2 mg protonema (by dry weight)).

EXAMPLE 2

Metal Recover Test Utilizing Protonema of Moss Plant 10 mL of the *Funaria hygrometrica* Hedw. protonemata mixture obtained in Example 1 above was concentrated and filled in a 5-mL performance test column (hereinafter, referred to as Fh column). Various metal-containing solutions were applied at a flow rate of 5 mL/24 minutes to the Fh column using a Peristar pump (ATTO SJ-1211).

1. Gold Chloride Solution and Chloroauric Acid Solution

In this test, a gold chloride (AuCl) solution (in hydrochloric acid, pH 3.0) and a chloroauric acid ($HAuCl_4$) solution (pH 1.5), each containing gold at 50 ppm, were used as metal-containing solutions. To stabilize the column before applying these metal-containing solutions, ultrapure water was applied for 18 hours. Ultrapure water was applied for 8 hours to wash off metals adhering to plant bodies after the removal test. Metals recovered by the moss plant were analyzed as follows.

Figure 1:
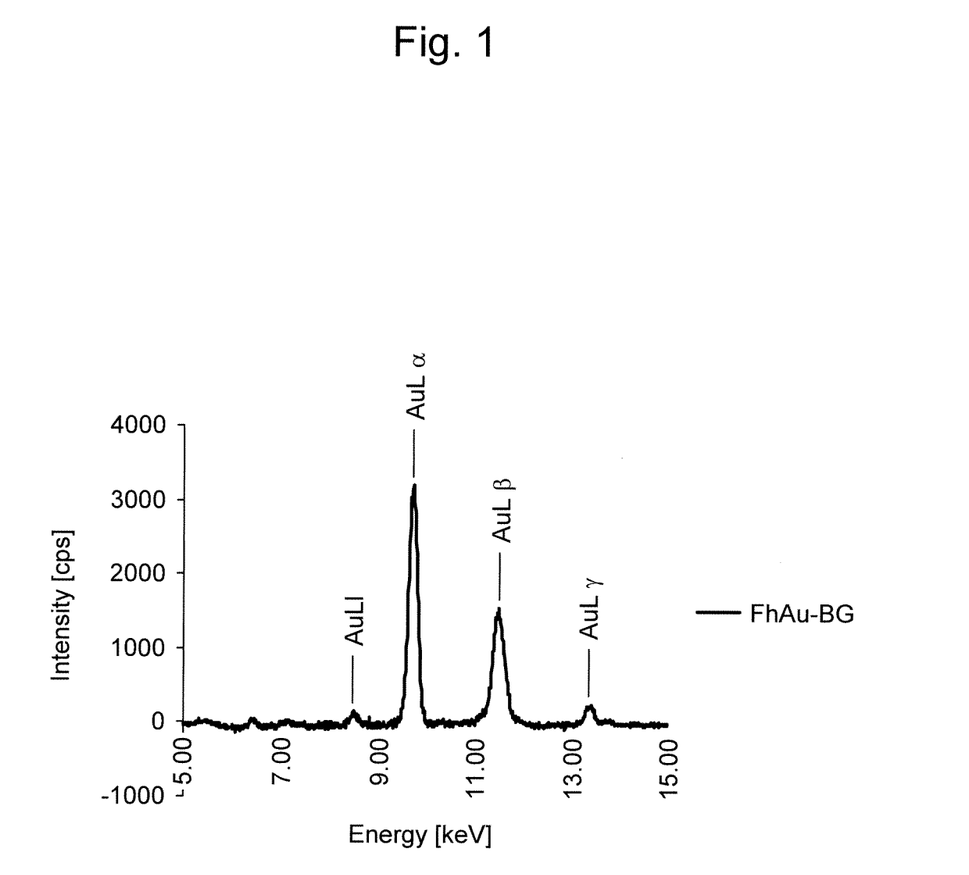
FIG. 1 shows the fluorescent X-ray spectrum obtained from *Funaria hygrometrica* Hedw. protonema after contact with gold chloride (AuCl). X-ray irradiation conditions are: irradiation time 180 seconds; pulse conditions P4; X-ray tube voltage 50 keV; X-ray tube current 1.0 mA; and X-ray tube diameter 100 μm.

In qualitative analyses using fluorescent X-ray spectra, the protonema brought into contact with the gold chloride (AuCl) solution was lyophilized and then the obtained protonema tissue was observed using an X-ray analyzer (HORIBA XGT-5000). The determined fluorescent X-ray spectra are shown in FIG. 1. As seen from FIG. 1, X-ray signals characteristic of gold were observed with high intensity. It was thus suggested that the protonema brought into contact with the metal-containing solution accumulated gold at high levels. Hence, various metals including gold were then quantitatively analyzed.

Figure 2:
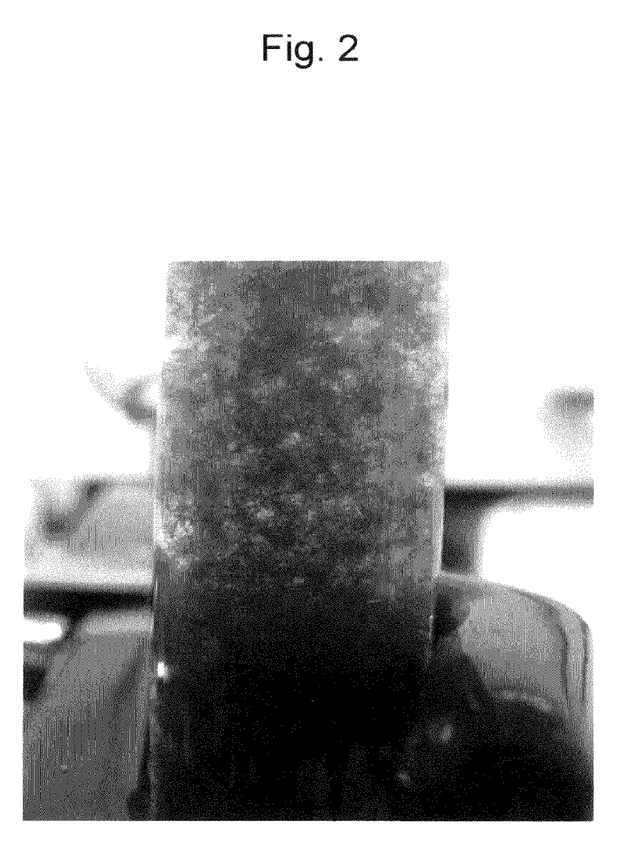
FIG. 2 is the photograph of *Funaria hygrometrica* Hedw. protonema having accumulated gold. As is clear from FIG. 2, the protonema having accumulated gold shows a red color. Thus, it is suggested that the protonema accumulates gold nanocolloids having specific particle sizes (10 nm to 35 nm).

Five (5) mL of aqua regia (hydrochloric acid:nitric acid=3:1) was added to a dry protonema sample brought into contact with a chloroauric acid ($HAuCl_4$) solution, and then wet ashing was performed with a microwave (Perkin Elmer MultiWave-3000). The obtained dispersion solution was brought up to a predetermined volume, and then filtered, thereby obtaining an ICP-MS determination solution, and subsequently subjected to quantitative analysis. The concentration of gold per dry plant body mass was 11.3%. Maximum accumulated concentrations of various metals that we obtained are as shown in Table 1. Also, the recovered gold had a red color, as shown in FIG. 2, and thus gold accumulated in protonemata was thought to be present in the form of nanocolloidal particles (particle size: 10-35 nm).

TABLE 1

| Metal | | Maximum accumulation capacity [mg/kg] |
|---|---|---|
| Lithium | Li | 269 |
| Aluminium | Al | 8,540 |
| Chromium | Cr | 64,900 |
| Manganese | Mn | 12,900 |
| Cobalt | Co | 24,900 |
| Nickel | Ni | 9,240 |
| Zinc | Zn | 5,370 |
| Selenium | Se | 1,010 |
| Yttrium | Y | 2,030 |
| Molybdenum | Mo | 11,900 |
| Silver | Ag | 6,610 |
| Platinum | Pt | 41,900 |
| Gold | Au | 113,000 |
| Thallium | Tl | 54,600 |
| Lead | Pb | 741,000 |

2. Liquid Waste from Gold Recycling Factory

In this test, liquid waste from a gold recycling factory was used as a metal-containing solution. The liquid waste was based on potassium cyanide and sodium cyanide, containing gold at a concentration of less than 1 μg/L that had remained unrecovered by a gold recovery process from a plating remover used in the gold recycling factory. The liquid waste was a dark yellowish alkaline solution (pH 10.0).

To stabilize the column before applying the liquid waste, ultrapure water was applied for 18 hours. Ultrapure water was applied to the column for 8 hours in order to wash off metals adhering to plant bodies after the removal test. Metals recovered by the moss plant were analyzed as follows.

Figure 3:
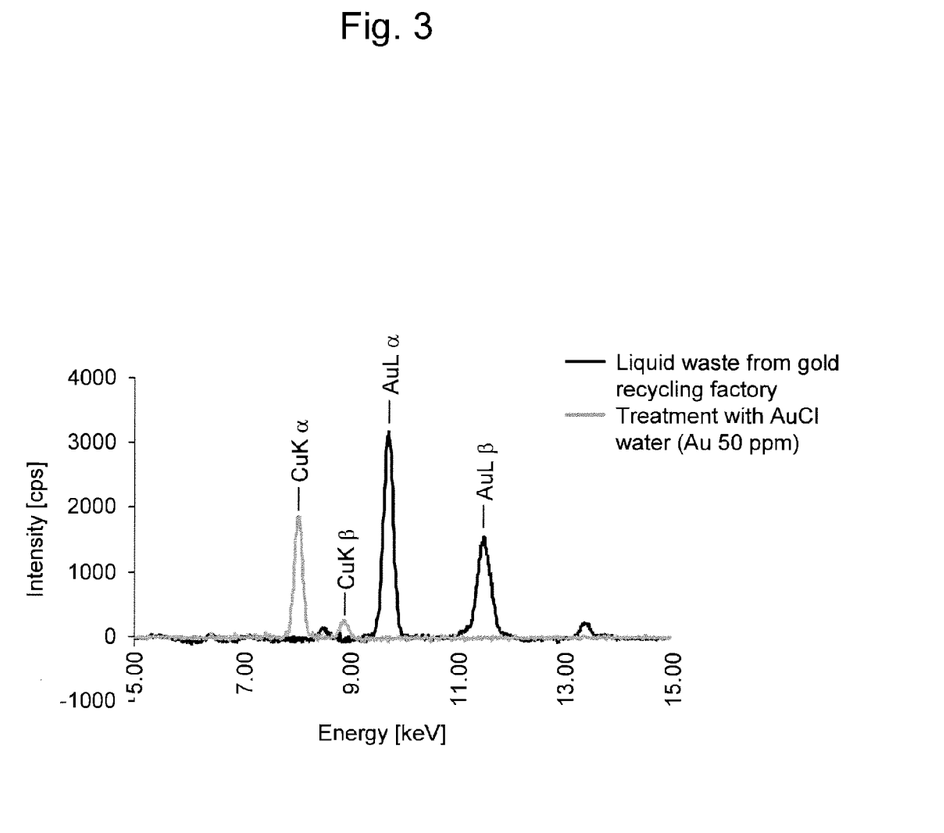
FIG. 3 shows the comparison between fluorescent X-ray spectrum obtained from *Funaria hygrometrica* Hedw. protonema after its contact with liquid waste from a gold recycling factory and the spectrum obtained from a gold chloride solution. X-ray irradiation conditions are: irradiation time 180 seconds; pulse conditions P4; X-ray tube voltage 50 keV; X-ray tube current 1.0 mA; and X-ray tube diameter 100 μm.

In qualitative analyses using fluorescent X-ray spectra, the protonema brought into contact with the liquid waste was lyophilized, and then the obtained protonema tissue was observed using an X-ray analyzer (HORIBA XGT-5000). The determined fluorescent X-ray spectra are shown in FIG. 3. As seen from FIG. 3, X-ray signals characteristic of gold were not obtained, but X-ray signals characteristic of copper were obtained, revealing that the protonema brought into contact with the liquid waste can unexpectedly accumulate copper at high levels. It was also suggested that gold as a target metal for recovery was accumulated at a concentration that is the same as or lower than the detection limit (i.e., 10,000 mg/kg) of X-ray analysis. Accordingly, quantitative analysis was conducted for gold.

Five (5) mL of aqua regia (hydrochloric acid:nitric acid=3:1) was added to a dry protonema sample brought into contact with the liquid waste, and then wet ashing was performed using a microwave (Perkin Elmer MultiWave-3000). The obtained dispersion solution was brought up to a predetermined volume, and then filtered, thereby obtaining an ICP-MS determination solution, and subsequently the quantitative analysis was conducted. The gold content per dry plant body mass was determined. As shown in Table 2, the gold contents were 15.2 mg/kg (test No. 159) and 32.1 mg (test No. 159). Although these gold contents correspond to values which was the same as or lower than the detection limit with X-ray analysis, they were comparable to the gold content in gold ore. Thus, the effectiveness of gold recycling recovery from the liquid waste by protonemata was confirmed.

To confirm whether the moss plant had recovered metals other than gold from the liquid waste, qualitative data for 30 elements, including gold, in the ICP-MS determination solution were obtained by ICP-MS. Next, as shown in Table 3, intensity values per dry plant body weight (Net Intens. Mean in Table 3) were calculated. Copper was found to have the highest intensity. Also, a correlation coefficient between two test data was determined, so that it was found that they agreed sufficiently (correlation coefficient: 0.9997). Specifically, elemental profiles in the moss plant that had processed the liquid waste were highly analogous to each other. It was thus confirmed that the metal recovery pattern in the moss plant may be very strictly controlled.

TABLE 2

Results of quantitative analyses of gold content in *Funaria hygrometrica* Hedw. protonema cells

| Test No. | Au content [mg/kg dry weight] |
|---|---|
| 159 | 15.2 |
| 160 | 32.1 |

TABLE 3

Wet ashing solution of moss plant body [DW-based]
NIM*(50/1000)/DW

| Analyte | Meas. Intens. Mean Blank | Net Intens. Mean Test159 | Net Intens. Mean Test160 | Mass |
|---|---|---|---|---|
| B | 69 | 119.8053971 | 103.621641 | 11 |
| Na | 39218 | 8663.363156 | 8184.334737 | 23 |
| Mg | 234 | 6470.532257 | 9954.789637 | 24 |
| Al | 366 | 2655.115324 | 1779.203137 | 27 |
| K | 251826 | 1157.128422 | 1136.969937 | 39 |
| Ca | 2114 | 573.7480564 | 504.1356754 | 44 |
| Sc | 1360 | 189.9332602 | 190.3918132 | 45 |
| V | 1208 | 5817.969002 | 6813.717525 | 51 |
| Cr | 2989 | 182.2969958 | 146.3782366 | 52 |
| Mn | 75 | 2931.934033 | 2998.433903 | 55 |
| Fe | 5601 | 95.1833908 | 123.4372439 | 57 |
| Co | 73 | 463.9139185 | 405.0588803 | 59 |
| Ni | 157 | 6583.94802 | 4584.897611 | 58 |
| Cu | 911 | 173058.246 | 179736.5811 | 63 |
| Zn | 223 | 690.4222884 | 933.0545014 | 64 |
| As | 46 | 124.458976 | 145.3815503 | 75 |
| Se | 5 | 5.940835946 | 7.643272892 | 82 |
| Sr | 13 | 404.8353292 | 384.2964914 | 88 |
| Y | 1 | 2.823134796 | 2.027846782 | 89 |
| Mo | 6 | 8.327936259 | 10.5067815 | 98 |
| Pd | 5 | 108.5777691 | 137.225612 | 106 |
| Ag | 52 | 2334.935564 | 2582.702421 | 107 |
| Cd | 3 | 2.969890282 | 10.10315956 | 114 |
| Sb | 87 | 16.55280042 | 18.67888033 | 121 |
| Eu | 0 | 1.316630094 | 0.888495014 | 153 |
| Pt | 68 | 14.83850052 | 9.534161378 | 195 |
| Au | 40 | 106.2375914 | 246.9186129 | 197 |
| Hg | 5 | 0.362246604 | 0.646727108 | 202 |
| Tl | 1 | 0.189827586 | 0.22967815 | 205 |
| Pb | 64 | 470.6470167 | 482.2949501 | 208 |

Taking together the above test results, it was revealed that the protonema of the moss plant of the family Funariaceae used selectively adsorbs and accumulates various metals from a solution in which metals have been dissolved, and such metals include industrially valuable metals having an ionization tendency lower than that of silver.

The protonema of a moss plant of the present invention can be mass-produced, making it possible to effectively utilize biomass in a sustainable manner because of the growth ability of such a moss plant. Thus, the technique according to the present invention differs from the metal recovery techniques using inorganic materials in terms of the level of usefulness.

Also, as described above, the protonema of a moss plant of the present invention can be utilized as a biomass resource for metal recovery that can be widely put to practical use on the basis of the previous report (WO 2008/105353) that the protonema is able to maintain its metal recovery ability even under extremely acidic conditions or alkaline conditions and has the resistance to heavy metals such as Cu, Zn, Co, and As, for example.

INDUSTRIAL APPLICABILITY

According to the present invention, a method for recovery of a metal having an ionization tendency lower than that of silver is provided. This method is advantageous in terms of metal recovery costs since the protonema of a moss plant, which is conveniently available and can be cultured in large amounts, is used.

The present invention enables efficient recovery of industrially valuable metals from metal-containing solutions.

All publications, patents, and patent applications cited herein are incorporated herein by reference in their entirety.

The invention claimed is:

1. A method for recovery of gold or platinum, comprising bringing a protonema of a moss plant belonging to the family Funariaceae into contact with a solution in which the gold or platinum is dissolved; and recovering the gold or platinum from the protonema.

2. The method according to claim 1, wherein the protonema is of one or more moss plant(s) selected from the group consisting of the genus *Funaria*, the genus *Physcomitrium*, and the genus *Entosthodon*.

3. The method according to claim 1, wherein the protonema is of one or more moss plant(s) belonging to the genus *Funaria*.

4. The method according to claim 1, wherein the protonema is of *Funaria hygrometrica* Hedw.

5. The method according to claim 1, wherein the solution in which the gold or platinum is dissolved has a pH from 1.0 to 12.0.

6. The method according to claim 1, wherein the protonema has a maximum ability to accumulate gold accounting for 10% or more of the dry weight of protonema.

7. The method according to claim 1, wherein the protonema has a maximum ability to accumulate platinum accounting for 4% or more of the dry weight of protonema.

8. The method according to claim 1, wherein the gold or platinum is recovered by heat treatment or extraction of the protonema.

* * * * *